United States Patent [19]

Richards

[11] 4,283,612
[45] Aug. 11, 1981

[54] MACHINE GUARDING APPARATUS

[75] Inventor: Edward G. Richards, Columbia, Md.

[73] Assignee: Baltimore Aircoil Co., Inc., Jessup, Md.

[21] Appl. No.: 146,585

[22] Filed: May 5, 1980

[51] Int. Cl.³ .............................................. H01H 9/20
[52] U.S. Cl. .................................. 200/334; 200/153 C
[58] Field of Search ......................... 200/334, 153 C; 335/147

[56] References Cited

U.S. PATENT DOCUMENTS

| 562,116 | 6/1896 | Bryant | 200/153 C |
|---|---|---|---|
| 1,949,568 | 3/1934 | Gotham | 200/153 C |
| 2,313,166 | 3/1943 | Nicholas | 200/153 C |

FOREIGN PATENT DOCUMENTS 2148760  8/1978  Fed. Rep. of Germany ....... 200/153 C Primary Examiner—Willis Little
Attorney, Agent, or Firm—Michael C. Sudol, Jr.; Harry E. Westlake

[57] ABSTRACT

An apparatus for eliminating accidents on power machines such as brake presses which comprises in combination a safety pedal, proximity switch and metal plate.

3 Claims, 4 Drawing Figures

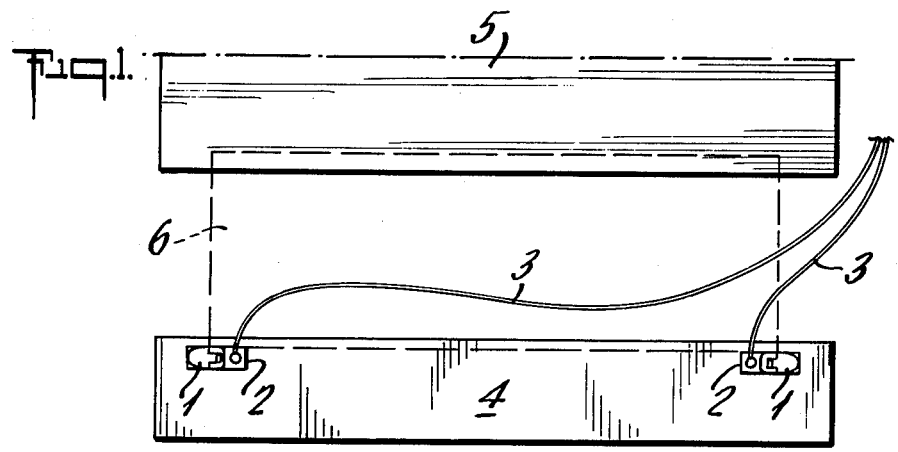
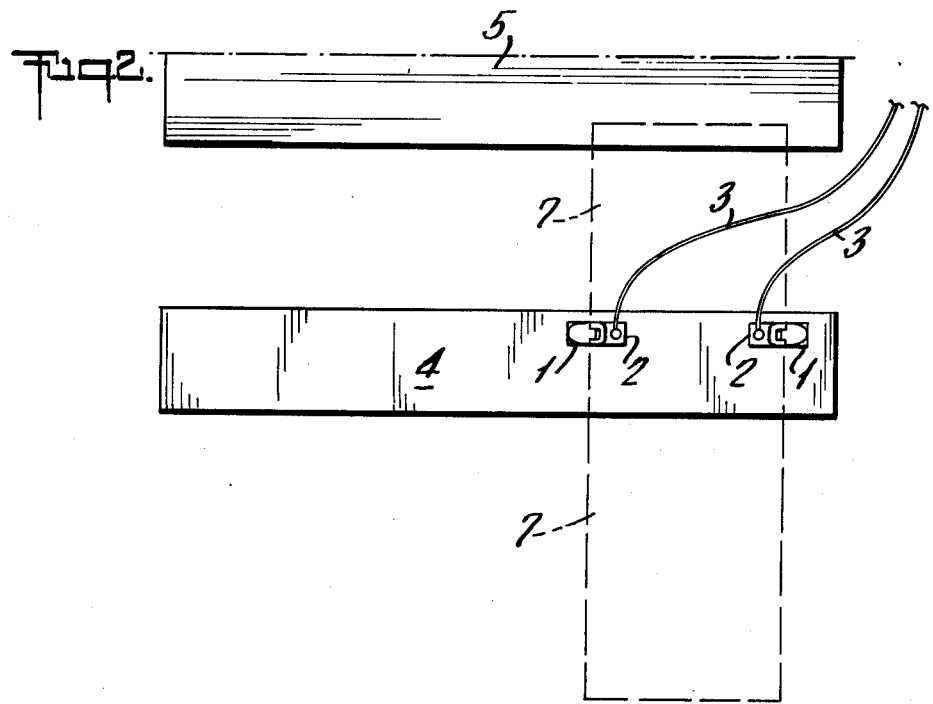
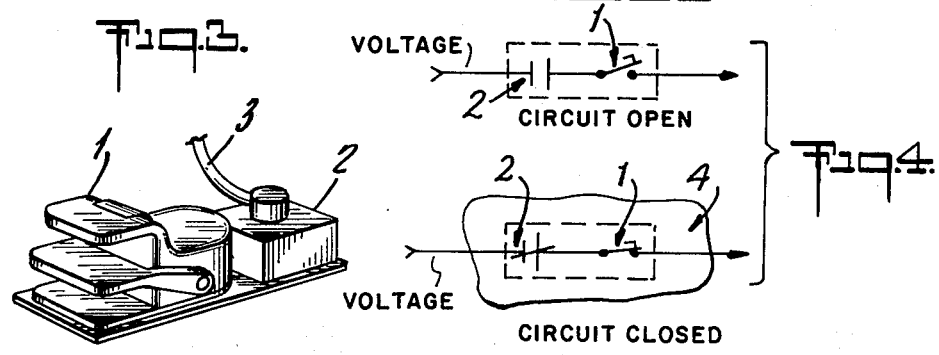

MACHINE GUARDING APPARATUS

BACKGROUND OF THE INVENTION

One of the main obstacles in guarding a machine such as a mechanical press where there are pinch points or rollers so that operators of said machine are not injured is the nature of the machine itself. Several previous solutions to this problem have not proven very effective in guarding these types of machines against hazards to the operator(s) and in retaining production hours at an acceptable level. These previous solutions included palm buttons which were on/off control buttons for the machine located at a level on the machine whereby the operator had to push the button to either activate the machine or shut it down. Other similar preventing means were guard bars located across the face of the machine which the operator could activate by merely pushing or leaning against the bar with his arms or forearms. Still another safety device for diminishing accidents on machines was the ordinary foot pedal mode of operation. In fact, using a foot pedal in conjunction with a press machine where large pieces of metal are being fed into the machine by one or more operators is a very practical means of activating the press because the operator's hands are a good distance from any pinch points. However, the closer the operator's hands get to the machine, the more his chances of being injured increase. When an operator is placing his hands in or near pinch points regularly he is extremely susceptible to injury. With one foot constantly on the foot pedal, and his hands being used to feed and process metal parts in and out of the machine regularly, an operator's concentration on safety greatly diminishes and the chances of an operator making a mistake that would result in an injury are too great to ignore.

SUMMARY OF THE INVENTION

With my invention herein described, I have established a very effective means for guarding a machine, such as a mechanical press against hazards to the operator(s) working the machine while retaining production hours at an acceptable level. Thus, an object of this invention is both to guard a dangerous machine (with regard to operator safety) and retain production hours.

Another object is to prevent injury to an operator of a machine particularly where there is more than one operator on the machine by coordinating activation of the machine by each operator.

My invention can be further described by reference to the drawings.

FIG. 1 is a top view sketch of the foot pedal, proximity switch and metal plate of my invention in conjuction with a press brake machine wherein the wide piece of work material is being fed into the machine.

FIG. 2 is the same type view as in FIG. 1 except a narrow piece of work material is being fed into the machine.

FIG. 3 is an isometric view of the foot pedal and proximity switch.

FIG. 4 is an electrical circuit diagram of the proximity switch and foot pedal switch when each is in an open and closed position.

If one refers to FIGS. 1, 2 and 3, there is shown a foot pedal 1 which is a typical electrical foot pedal switch such as, for example, those manufactured by the Square D Manufacturing Co., Class 9002, Series B, Type AW-6 which in ordinary operation would control the on/off operation of a machine. Typically when the operator steps on the foot pedal, presses it down and holds it down, it would cause an electrical current to flow therethrough and the machine would be activated. Thus, if only this foot pedal switch were integrated with the machine, the operator when he wanted the press brake machine to work would step on the foot pedal which would activate the electric circuit and by means of a control panel and electrical attachment cause the machine to be activated. [The control panel and electrical attachment although not shown in the drawing are operated as discussed above.]

In addition, along with the foot pedal switch 1, there is included an electrical box and proximity switch 2 in the circuit. The proximity switch including the electrical boxes are well known equipment in the prior art and a typical proximity switch is one manufactured by the General Equipment Co., namely, a GO-switch, Model 100B proximity limit switch. The typical proximity switches 2 used here are those which are activated magnetically by any metal which can act as a magnet. In my invention, the metal which is used to activate the proximity switch 2 is a steel sheet 4, which in effect acts as a saftey strip, being 16 gauge galvanized, 24" wide×4' long sheet, cemented to the floor. This sheet of metal 4 is located a sufficient distance from the machine 5 so that the operator cannot place his hands in the machine without stepping off the switch 2, in our case about 42" from the front of the press brake machine. Thus, in actuality the proximity switches 2 are connected and part of the foot pedal assembly 1. The foot pedal 1 and proximity switch 2 are electrically connected through electrical cables 3 to a main control panel (not shown) which panel is electrically connected to the operating mechanism of the machine to turn it on when one or both foot pedals 1 are depressed and remain depressed while on the metal sheet 4.

In operation, when the operator of the machine wants to activate the machine, he continuously steps on the foot pedal but before an electrical circuit is completed, the proximity switch 2 which is part of the foot pedal assembly 1 must sense the presence of this strip of metal 4 or it will not activate. The sheet of metal 4 magnetically activates the proximity switch 2. It will be seen that if the sheet of metal 4 is fastened to the floor at a distance from the machine which is beyond the operator's normal reach, the operator can never reach the pinch point of the press brake machine or the danger point of any machine when using the foot pedal operation.

FIG. 4 shows the foot switch assembly (seen in FIG. 3) which consists of the foot pedal switch 1 and the proximity switch 2 in an open circuit and in a closed circuit. The proximity switch 2 as well as the foot pedal switch 1 wired normally in an open position show that the circuit to be energized is broken in 2 positions. When the circuit is to be energized and the machine 5 is to be operated, the proximity switch 2 will close when placed on a metal plate 4 which is mounted on the floor and the foot pedal switch will close when the operator steps on the switch to operate the machine. Only when both the proximity switch is on a metal plate and when the foot pedal switch is closed will the circuit be energized and the machine 5 operate. If the foot switch assembly (consisting of the proximity switch 2 and foot pedal switch 1 as shown in FIG. 3) is moved from the metal plate, the circuit will not be energized because the proximity switch will be open. This is true even if the foot pedal switch 1 is pressed down to close the circuit. Since the circuit is broken and the machine will not operate when the proximity switch 2 is removed for any reason from the metal plate 4, one can place the metal plate far enough away from the machine 5 so that an operator cannot step on the foot pedal switch to activate that portion of the circuit and simultaneously be close enough to the machine to be able to be injured by any pinch points or any dangerous propensities of the machine. However, since the metal plate 4 can be of any dimension, one can position it along any part of the machine 5, as shown in FIG. 1, so long as one cannot physically reach into the machine and simultaneously press the foot pedal switch 1 down while it is on the metal plate 4.

As can be seen also from FIG. 1 where a machine 5 such as the press brake machine is a large one and several operators are needed to handle the equipment or article which here is a wide piece of metal to be worked 6 and feed it into the machine, several foot pedals 1 and proximity switches 2 can be electrically coordinated with each other so that all the foot pedals 1 laying on the metal plate 4 must be activated before an electrical connection is made to the machine to activate the machine. Thus, for example, when there is a wide piece of equipment 6 being fed into the press brake, two operators can handle the equipment and activate the machine by both pressing down on the foot pedal 1 which are located on the metal strip 4 in the approximate positions as shown in FIG. 1. Similarly, as in FIG. 2, when a narrow but long piece of equipment 7 is being fed into the machine 5 two operators can handle this equipment 7 and activate the machine by both pressing down on each foot pedal 1 while the foot pedal and proximity switch 2 of each operator is located on the metal strip 4. The foot pedals and proximity switches are appropriately located for this operation as shown in FIG. 2.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed is:

1. A method for eliminating accidents on machines having dangerous propensities which comprises:
    (a) locating a strip of metal a sufficient distance from the machine so that one cannot stand on the metal and reach into the machine,
    (b) placing a foot pedal switch on said strip,
    (c) connecting a proximity switch to the foot pedal switch, which proximity switch only activates when it is near metal,
    (d) activating the machine by continuously pressing down on the foot pedal switch while said foot pedal switch and proximity switch are located on the metal strip.

2. A method of claim 1 which comprises locating more than one foot pedal switch and proximity switch on the strip of metal.

3. A method of claim 2 which comprises activating the machine when all foot pedal and proximity switches are simultaneously pressed down.

* * * * *